(12) United States Patent
Tarquini et al.

(10) Patent No.: US 7,444,679 B2
(45) Date of Patent: Oct. 28, 2008

(54) NETWORK, METHOD AND COMPUTER READABLE MEDIUM FOR DISTRIBUTING SECURITY UPDATES TO SELECT NODES ON A NETWORK

(75) Inventors: Richard Paul Tarquini, Apex, NC (US); George Simon Gales, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1333 days.

(21) Appl. No.: 10/001,446

(22) Filed: Oct. 31, 2001

(65) Prior Publication Data
US 2003/0084320 A1    May 1, 2003

(51) Int. Cl.
    *G06F 21/20* (2006.01)
(52) U.S. Cl. .......................................... 726/25; 726/23
(58) Field of Classification Search ................. 726/32, 726/23, 25; 709/224
    See application file for complete search history.

(56) References Cited

U.S. PATENT DOCUMENTS

| | | | |
|---|---|---|---|
| 4,007,450 A | | 2/1977 | Haibt et al. |
| 4,562,539 A | | 12/1985 | Vince |
| 5,905,859 A | * | 5/1999 | Holloway et al. ............. 726/22 |
| 6,304,973 B1 | * | 10/2001 | Williams ....................... 726/3 |

FOREIGN PATENT DOCUMENTS

| | | |
|---|---|---|
| EP | 1160646 A2 | 12/2001 |
| EP | 1259026 | 11/2002 |
| GB | 2353885 A | 3/2001 |
| WO | WO0227443 A2 | 4/2002 |
| WO | WO03/029934 | 4/2003 |

OTHER PUBLICATIONS

UK Search Report dated Nov. 1, 2004 (4 pages).

* cited by examiner

*Primary Examiner*—Gilberto Barron, Jr.
*Assistant Examiner*—Laurel Lashley (57) ABSTRACT

A network having a intrusion protection system comprising a network medium, a management node connected to the network medium and running an intrusion prevention system management application, and a plurality of nodes connected to the network medium and running an instance of an intrusion protection system application, at least one of the nodes having an identification assigned thereto based on a logical assignment grouping one or more of the plurality of nodes, each node sharing the identification being commonly vulnerable to at least one network exploit is provided. A method of transmitting a command and security update message to a subset of nodes of a plurality of network nodes comprising generating an update message by a management node of the network, addressing the update message to a network address shared by the subset of nodes, transmitting the update message, and receiving and processing the update message by the subset of nodes is provided. A computer-readable medium having stored thereon a set of instructions to be executed, the set of instructions, when executed by a processor, cause the processor to perform a computer method of generating, by the computer, a message addressed to a subset of nodes on a network, transmitting the message on a network medium of the network to the subset of nodes, receiving the message by a router terminating the network medium, and forwarding, by the router, the message to any nodes included in the subset of nodes on a second network medium terminated by the router is provided.

3 Claims, 6 Drawing Sheets

NETWORK, METHOD AND COMPUTER READABLE MEDIUM FOR DISTRIBUTING SECURITY UPDATES TO SELECT NODES ON A NETWORK

TECHNICAL FIELD OF THE INVENTION

This invention relates to network technologies, and more particularly, to a technique for distributing command and security updates to select nodes on a network.

CROSS-REFERENCE TO RELATED APPLICATIONS

This patent application is related to co-pending U.S. patent application, Ser. No. 10/333501, entitled "METHOD AND COMPUTER READABLE MEDIUM FOR SUPPRESSING EXECUTION OF SIGNATURE FILE DIRECTIVES DURING A NETWORK EXPLOIT," filed Oct. 31, 2001, co-assigned herewith; U.S. patent application, Ser. No. 10/001431, entitled "SYSTEM AND METHOD OF DEFINING THE SECURITY CONDITION OF A COMPUTER SYSTEM," filed Oct. 31, 2001, co-assigned herewith; U.S. patent application, Ser. No. 10/001410, entitled "SYSTEM AND METHOD OF DEFINING THE SECURITY VULNERABILITIES OF A COMPUTER SYSTEM," filed Oct. 31, 2001, co-assigned herewith; U.S. patent application, Ser. No. 10/002695, entitled "SYSTEM AND METHOD OF DEFINING UNAUTHORIZED INTRUSIONS ON A COMPUTER SYSTEM," filed Oct. 31, 2001, co-assigned herewith; U.S. patent application, Ser. No. 10/02423, entitled "NETWORK INTRUSION DETECTION SYSTEM AND METHOD," filed Oct. 31, 2001, co-assigned herewith; U.S. patent application, Ser. No. 10/001445, entitled "NODE, METHOD AND COMPUTER READABLE MEDIUM FOR INSERTING AN INTRUSION PREVENTION SYSTEM INTO A NETWORK STACK," filed Oct. 31, 2001, co-assigned herewith; U.S. patent application, Ser. No. 10/003815, entitled "METHOD, COMPUTER-READABLE MEDIUM, AND NODE FOR DETECTING EXPLOITS BASED ON AN INBOUND SIGNATURE OF THE EXPLOIT AND AN OUTBOUND SIGNATURE IN RESPONSE THERETO," filed Oct. 31, 2001, co-assigned herewith; U.S. patent application, Ser. No. 10/003747, entitled "METHOD, COMPUTER READABLE MEDIUM, AND NODE FOR A THREE-LAYERED INTRUSION PREVENTION SYSTEM FOR DETECTING NETWORK EXPLOITS," filed Oct. 31, 2001, co-assigned herewith; U.S. patent application, Ser. No. 10/002072, entitled "SYSTEM AND METHOD OF AN OS-INTEGRATED INTRUSION DETECTION AND ANTI-VIRUS SYSTEM," filed Oct. 31, 2001, co-assigned herewith; U.S. patent application, Ser. No. 10/002697, entitled "METHOD, NODE AND COMPUTER READABLE MEDIUM FOR IDENTIFYING DATA IN A NETWORK EXPLOIT," filed Oct. 31, 2001, co-assigned herewith; U.S. Patent Application, Ser. No. 10/003820, entitled "NODE, METHOD AND COMPUTER READABLE MEDIUM FOR OPTIMIZING PERFORMANCE OF SIGNATURE RULE MATCHING IN A NETWORK," filed Oct. 31, 2001, co-assigned herewith; U.S. patent application, Ser. No. 10/003819, entitled "METHOD, NODE AND COMPUTER READABLE MEDIUM FOR PERFORMING MULTIPLE SIGNATURE MATCHING IN AN INTRUSION PREVENTION SYSTEM," filed Oct. 31, 2001, co-assigned herewith; U.S. Patent Application, Ser. No. 10/002694, entitled "USER INTERFACE FOR PRESENTING DATA FOR AN INTRUSION PROTECTION SYSTEM," filed Oct. 31, 2001, co-assigned herewith; U.S. patent application, Ser. No. 10/001728, entitled "NODE AND MOBILE DEVICE FOR A MOBILE TELECOMMUNICATIONS NETWORK PROVIDING INTRUSION DETECTION," filed Oct. 31, 2001, co-assigned herewith; U.S. Patent Application, Ser. No. 10/003510, entitled "METHOD AND COMPUTER-READABLE MEDIUM FOR INTEGRATING A DECODE ENGINE WITH AN INTRUSION DETECTION SYSTEM," filed Oct. 31, 2001, co-assigned herewith; U.S. patent application, Ser. No. 10/002064, entitled "SYSTEM AND METHOD OF GRAPHICALLY DISPLAYING DATA FOR AN INTRUSION PROTECTION SYSTEM," filed Oct. 31, 2001, co-assigned herewith; and U.S. patent application, Ser. No. 10/001350, entitled "SYSTEM AND METHOD OF GRAPHICALLY CORRELATING DATA FOR AN INTRUSION PROTECTION SYSTEM," filed Oct. 31, 2001, co-assigned herewith.

BACKGROUND OF THE INVENTION

Network-exploit attack tools, such as denial-of-service (DoS) attack utilities, are becoming increasing sophisticated and, due to evolving technologies, simple to execute. Relatively unsophisticated attackers can arrange, or be involved in, computer system compromises directed at one or more targeted facilities. A network system attack (also referred to herein as an intrusion) is an unauthorized or malicious use of a computer or computer network and may involve hundred or thousands of unprotected, or alternatively compromised, Internet nodes together in a coordinated attack on one or more selected targets.

Network attack tools based on the client/server model have become a preferred mechanism for executing network attacks on targeted networks or devices. High capacity machines in networks having deficient security are often desired by attackers to launch distributed attacks therefrom. University servers typically feature high connectivity and capacity but relatively mediocre security. Such networks also often have inexperienced or overworked network administrators making them even more vulnerable for involvement in network attacks.

Network-exploit attack tools, comprising hostile attack applications such as denial-of-service (DoS) utilities, responsible for transmitting data across a network medium will often have a distinctive "signature," or recognizable pattern within the transmitted data. The signature may comprise a recognizable sequence of particular packets and/or recognizable data that is contained within one or more packets. Signature analysis is often performed by a network intrusion prevention system (IPS) and may be implemented as a pattern-matching algorithm and may comprise other signature recognition capabilities as well as higher-level application monitoring utilities. A simple signature analysis algorithm may search for a particular string that has been identified as associated with a hostile application. Once the string is identified within a network data stream, the one or more packets carrying the string may be identified as "hostile," or exploitative, and the IPS may then perform any one or more of a number of actions, such as logging the identification of the frame, performing a countermeasure, or performing another data archiving or protection measure.

Intrusion prevention systems (IPS) encompass technology that attempts to identify exploits against a computer system or network of computer systems. Numerous types of IPSs exist and each are generally classified as either a network-based, host-based, or node-based IPS.

Network-based IPS appliances are typically dedicated systems placed at strategic places on a network to examine data packets to determine if they coincide with known attack signatures. To compare packets with known attack signatures, network-based IPS appliances utilize a mechanism referred to as passive protocol analysis to inconspicuously monitor, or "sniff," all traffic on a network and to detect low-level events that may be discerned from raw network traffic. Network exploits may be detected by identifying patterns or other observable characteristics of network frames. Network-based IPS appliances examine the contents of data packets by parsing network frames and packets and analyzing individual packets based on the protocols used on the network. A network-based IPS appliance inconspicuously monitors network traffic inconspicuously, i.e., other network nodes may be, and often are, unaware of the presence of the network-based IPS appliance. Passive monitoring is normally performed by a network-based IPS appliance by implementation of a "promiscuous mode" access of a network interface device. A network interface device operating in promiscuous mode copies packets directly from the network media, such as a coaxial cable, 100baseT or other transmission medium, regardless of the destination node to which the packet is addressed. Accordingly, there is no simple method for transmitting data across the network transmission medium without the network-based IPS appliance examining it and thus the network-based IPS appliance may capture and analyze all network traffic to which it is exposed. Upon identification of a suspicious packet, i.e., a packet that has attributes corresponding to a known attack signature monitored for occurrence by the network-based IPS appliance, an alert may be generated thereby and transmitted to a management module of the IPS so that a networking expert may implement security measures. Network-based IPS appliances have the additional advantage of operating in real-time and thus can detect an attack as it is occurring. Moreover, a network-based IPS appliance is ideal for implementation of a state-based IPS security measure that requires accumulation and storage of identified suspicious packets of attacks that may not be identified "atomically," that is by a single network packet. For example, transmission control protocol (TCP) synchronization (SYN) flood attacks are not identifiable by a single TCP SYN packet but rather are generally identified by accumulating a count of TCP SYN packets that exceed a predefined threshold over a defined period of time. A network-based IPS appliance is therefore an ideal platform for implementing state-based signature detection because the network-based IPS appliance may collect all such TCP SYN packets that pass over the local network media and thus may properly archive and analyze the frequency of such events.

However, network-based IPS appliances may often generate a large number of "false positives," i.e., incorrect diagnoses of an attack. False positive diagnoses by network-based IPS appliances result, in part, due to errors generated during passive analysis of all the network traffic captured by the IPS that may be encrypted and formatted in any number of network supported protocols. Content scanning by a network-based IPS is not possible on an encrypted link although signature analysis based on protocol headers may be performed regardless of whether the link is encrypted or not. Additionally, network-based appliances are often ineffective in high speed networks. As high speed networks become more commonplace, software-based network-based IPS appliances that attempt to sniff all packets on a link will become less reliable. Most critically, network-based IPS appliances can not prevent attacks unless integrated with, and operated in conjunction with, a firewall protection system.

Host-based IPSs detect intrusions by monitoring application layer data. Host-based IPSs employ intelligent agents to continuously review computer audit logs for suspicious activity and compare each change in the logs to a library of attack signatures or user profiles. Host-based IPSs may also poll key system files and executable files for unexpected changes. Host-based IPSs are referred to as such because the IPS utilities reside on the system to which they are assigned to protect. Host-based IPSs typically employ application-level monitoring techniques that examine application logs maintained by various applications. For example, a host-based IPS may monitor a database engine that logs failed access attempts and/or modifications to system configurations. Alerts may be provided to a management node upon identification of events read from the database log that have been identified as suspicious. Host-based IPSs, in general, generate very few false-positives. However, host-based IPS such as log-watchers are generally limited to identifying intrusions that have already taken place and are also limited to events occurring on the single host. Because log-watchers rely on monitoring of application logs, any damage resulting from the logged attack will generally have taken place by the time the attack has been identified by the IPS. Some host-based IPSs may perform intrusion-preventative functions such as 'hooking' or 'intercepting' operating system application programming interfaces to facilitate execution of preventative operations by an IPS based on application layer activity that appears to be intrusion-related. Because an intrusion detected in this manner has already bypassed any lower level IPS, a host-based IPS represents a last layer of defense against network exploits. However, host-based IPSs are of little use for detecting low-level network events such as protocol events.

Node-based IPSs apply the intrusion detection and/or prevention technology on the system being protected. An example of node-based IPS technologies is inline intrusion detection. A node-based IPS may be implemented at each node of the network that is desired to be protected. Inline IPSs comprise intrusion detection technologies embedded in the protocol stack of the protected network node. Because the inline IPS is embedded within the protocol stack, both inbound and outbound data will pass through, and be subject to monitoring by, the inline IPS. An inline IPS overcomes many of the inherent weaknesses of network-based solutions. As mentioned hereinabove, network-based solutions are generally ineffective when monitoring high-speed networks due to the fact that network-based solutions attempt to monitor all network traffic on a given link. Inline intrusion prevention systems, however, only monitor traffic directed to the node on which the inline IPS is installed. Thus, attack packets can not physically bypass an inline IPS on a targeted machine because the packet must pass through the protocol stack of the targeted device. Any bypassing of an inline IPS by an attack packet must be done entirely by 'logically' bypassing the IPS, i.e., an attack packet that evades an inline IPS must do so in a manner that causes the inline IPS to fail to identify, or improperly identify, the attack packet. Additionally, inline IPSs provide the hosting node with low-level monitoring and detection capabilities similar to that of a network IPS and may provide protocol analysis and signature matching or other low-level monitoring or filtering of host traffic. The most significant advantage offered by inline IPS technologies is that attacks are detected as they occur. Whereas host-based IPSs determine attacks by monitoring system logs, inline intrusion detection involves monitoring network traffic and isolating those packets that are determined to be part of an attack against the hosting server and thus enabling the inline IPS to actually prevent the attack from succeeding. When a packet is determine to be part of an attack, the inline IPS layer may discard the packet thus preventing the packet from reaching the upper layer of the protocol stack where damage may be caused by the attack packet—an effect that essentially creates a local firewall for the server hosting the inline IPS and protecting it from threats coming either from an external network, such as the Internet, or from within the network. Furthermore, the inline IPS layer may be embedded within the protocol stack at a layer where packets have been unencrypted so that the inline IPS is effective operating on a network with encrypted links. Additionally, inline IPSs can monitor outgoing traffic because both inbound and outbound traffic respectively destined to and originating from a server hosting the inline IPS must pass through the protocol stack.

Although the advantages of inline IPS technologies are numerous, there are drawbacks to implementing such a system. Inline intrusion detection is generally processor intensive and may adversely effect the node's performance hosting the detection utility. Additionally, inline IPSs may generate numerous false positive attack diagnoses. Furthermore, inline IPSs cannot detect systematic probing of a network, such as performed by reconnaissance attack utilities, because only traffic at the local server hosting the inline IPS is monitored thereby.

Each of network-based, host-based and inline-based IPS technologies have respective advantages as described above. Ideally, an intrusion prevention system will incorporate all of the aforementioned intrusion detection strategies. Additionally, an IPS may comprise one or more event generation mechanisms that report identifiable events to one or more management facilities. An event may comprise an identifiable series of system or network conditions or it may comprise a single identified condition. An IPS may also comprise an analysis mechanism or module and may analyze events generated by the one or more event generation mechanisms. A storage module may be comprised within an IPS for storing data associated with intrusion-related events. A countermeasure mechanism may also be comprised within the IPS for executing an action intended to thwart, or negate, a detected exploit.

Control and management of an IPS designed for protecting a large corporate, or otherwise large-scale, network requires mechanisms for distributing command and security updates from one or more management nodes to various IPS servers located throughout the network. For instance, as new attacks are developed and signatures and countermeasures are defined therefor, the newly-defined signatures and countermeasures need to be integrated into nodes of the network that may be targeted by the new attack. Thousands of systems may be included in a network and protected by an IPS. The relatively frequent introduction of new attacks requires attack rules used for filtering network traffic to be routinely updated. Prior art systems for distribution of command and security updates throughout an IPS-protected network include broadcast updates from a centralized management node and installation of security updates individually at each node having IPS capabilities. Broadcasting command and security updates allows for the IPS system to be updated network-wide from a single location but, however, requires expensive high bandwidth processing capabilities at management node that scales in proportion to the network size. Updating attack rules on a network wide basis consumes valuable network bandwidth and necessitates a correspondingly large bandwidth capacity of the management node(s). Individual installation of security updates and each node of the network is undesirable due to the requisite time and labor required to fully upgrade the IPS.

SUMMARY OF THE INVENTION

In accordance with an embodiment of the present invention, a network having a intrusion protection system comprising a network medium, a management node connected to the network medium and running an intrusion prevention system management application, and a plurality of nodes connected to the network medium and running an instance of an intrusion protection system application, at least one of the nodes having an identification assigned thereto based on a logical assignment grouping one or more of the plurality of nodes, each node sharing the identification being commonly vulnerable to at least one network exploit is provided.

In accordance with another embodiment of the present invention, a method of transmitting a command and security update message to a subset of nodes of a plurality of network nodes comprising generating an update message by a management node of the network, addressing the update message to a network address shared by the subset of nodes, transmitting the update message, and receiving and processing the update message by the subset of nodes is provided.

In accordance with yet another embodiment of the present invention, a computer-readable medium having stored thereon a set of instructions to be executed, the set of instructions, when executed by a processor, cause the processor to perform a computer method of generating, by the computer, a message addressed to a subset of nodes on a network, transmitting the message on a network medium of the network to the subset of nodes, receiving the message by a router terminating the network medium, and forwarding, by the router, the message to any nodes included in the subset of nodes on a second network medium terminated by the router is provided.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 7 of the drawings, like numerals being used for like and corresponding parts of the various drawings.

Figure 1:
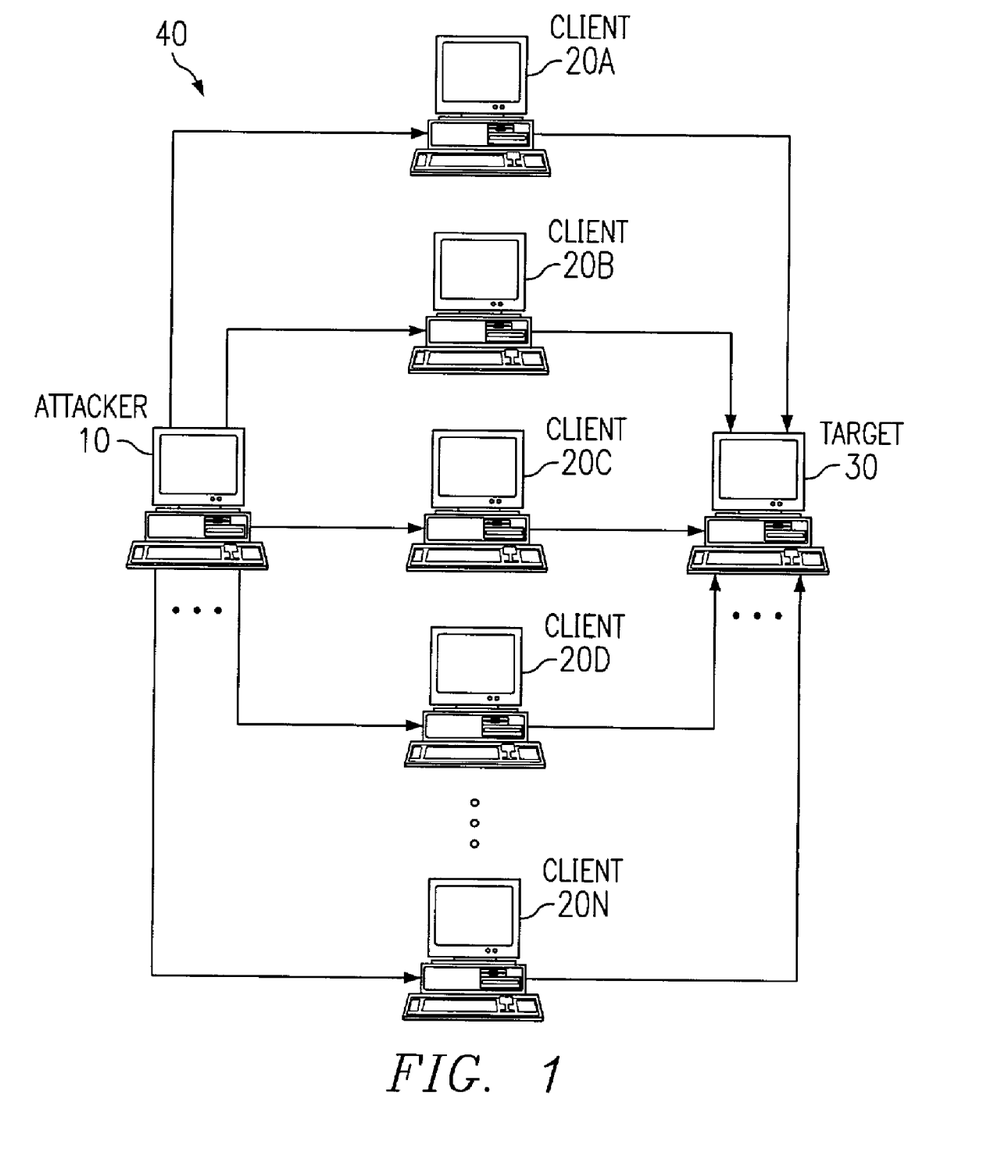
FIG. 1 illustrates an exemplary arrangement for executing a computer system compromise according to the prior art.

In FIG. 1, there is illustrated an exemplary arrangement for executing a computer system compromise—the illustrated example showing a simplified distributed intrusion network 40 arrangement typical of distributed system attacks directed at a target machine 30. An attack machine 10 may direct execution of a distributed attack by any number of attack agents 20A-20N by one of numerous techniques such as remote control by IRC "robot" applications. Attack agents 20A-20N, also referred to as "zombies" and "attack agents," are generally computers that are available for public use or that have been compromised such that a distributed attack may be launched upon command of an attack machine 10. Numerous types of distributed attacks may be launched against a target machine 30. The target machine 30 may suffer extensive damage from simultaneous attack by attack agents 20A-20N and the attack agents 20A-20N may be damaged from the client attack application as well. A distributed intrusion network may comprise an additional layer of machines involved in an attack intermediate the attack machine 10 and attack agents 20A-20N. These intermediate machines are commonly referred to as "handlers" and each handler may control one or more attack agents 20A-20N. The arrangement shown for executing a computer system compromise is illustrative only and may compromise numerous arrangements that are as simple as a single attack machine 10 attacking a target machine 30 by, for example, sending malicious probe packets or other data intended to compromise target machine 30. Target machine may be, and often is, connected to a larger network and access thereto by attack machine 10 may cause damage to a large collection of computer systems commonly located within the network.

Figure 2:
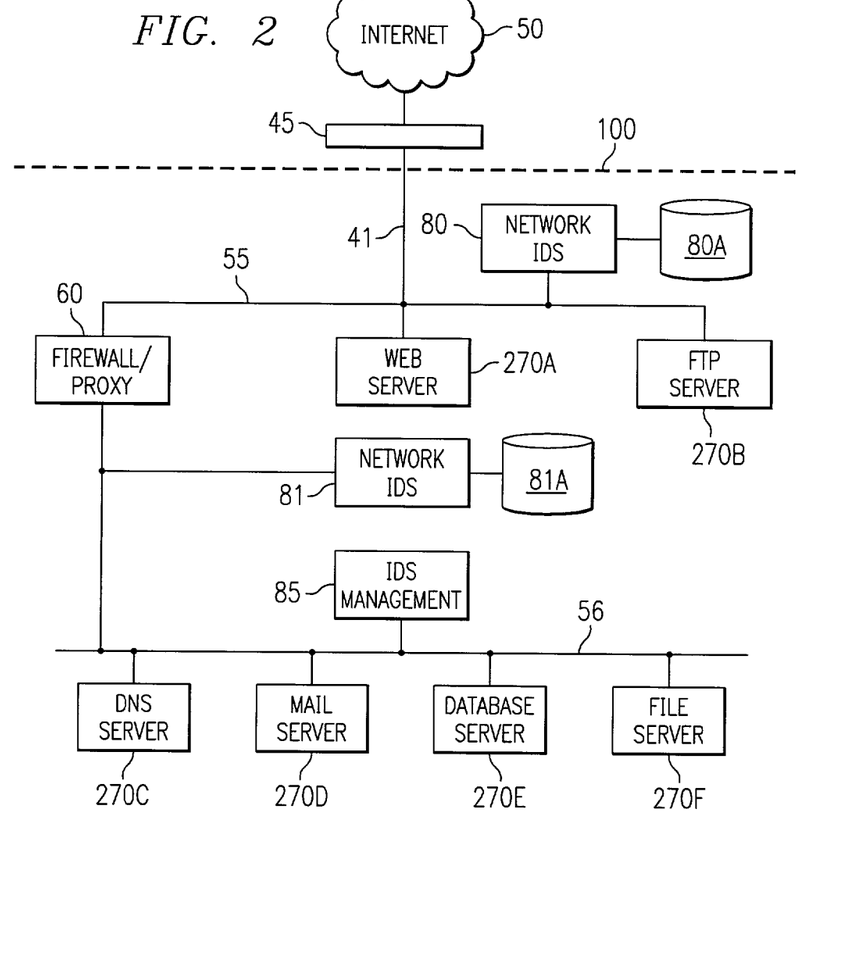
FIG. 2 illustrates a comprehensive intrusion prevention system employing network-based and hybrid host-based and node based intrusion detection technologies according to an embodiment of the invention.

In FIG. 2, there is illustrated a comprehensive intrusion prevention system employing network-based and hybrid host-based/node-based intrusion detection technologies according to an embodiment of the invention. One or more networks 100 may interface with the Internet 50 via a router 45 or other device. In the illustrative example, two Ethernet networks 55 and 56 are comprised in network 100. Ethernet network 55 comprises a web-content server 270A and a file transport protocol-content server 270B. Ethernet network 56 comprises a domain name server 270C, a mail server 270D, a database sever 270E and a file server 270F. A firewall/proxy router 60 disposed intermediate Ethernets 55 and 56 provides security and address resolution to the various systems of network 56. A network-based IPS appliance 80 and 81 is respectively implemented on both sides of firewall/proxy router 60 to facilitate monitoring of attempted attacks against one or more elements of Ethernets 55 and 56 and to facilitate recording successful attacks that successfully penetrate firewall/proxy router 60. Network-based IPS appliances 80 and 81 may respectively comprise (or alternatively be connected to) a database 80A and 81A of known attack signatures, or rules, against which network frames captured thereby may be compared. Alternatively, a single database (not shown) may be centrally located within network 100 and may be accessed by network-based IPS appliances 80 and 81. Accordingly, network-based IPS appliance 80 may monitor all packets inbound from Internet 50 to network 100 arriving at Ethernet network 55. Similarly, a network-based IPS appliance 81 may monitor and compare all packets passed by firewall/proxy router 60 for delivery to Ethernet network 56. An IPS management node 85 may also be part of network 100 to facilitate configuration and management of the IPS components in network 100.

In view of the above-noted deficiencies of network-based intrusion prevention systems, a hybrid host-based and node-based intrusion prevention system is preferably implemented within each of the various nodes, such as servers 270A-270N (also referred to herein as "nodes"), of Ethernet networks 55 and 56 in the secured network 100. Management node 85 may receive alerts from respective nodes within network 100 upon detection of an intrusion event by any one of the network-based IPS appliances 80 and 81 as well as any of the nodes of network 100 having a hybrid agent-based and node-based IPS implemented thereon. Additionally, each node 270A-270F may respectively employ a local file system for archiving intrusion-related events, generating intrusion-related reports, and storing signature files against which local network frames and/or packets are examined.

Preferably, network-based IPS appliances 80 and 81 are dedicated entities for monitoring network traffic on associated Ethernets 55 and 56 of network 100. To facilitate intrusion detection in high speed networks, network-based IPS appliances 80 and 81 preferably comprise a large capture RAM for capturing packets as they arrive on respective Ethernet networks 55 and 56. Additionally, it is preferable that network-based IPS appliances 80 and 81 respectively comprise hardware-based filters for filtering network traffic, although IPS filtering by network-based IPS appliances 80 and 81 may be implemented in software. Moreover, network-based IPS appliances 80 and 81 may be configured, for example by demand of IPS management node 85, to monitor one or more specific devices rather than all devices on a common network. For example, network-based IPS appliance 80 may be directed to monitor only network data traffic addressed to web server 270A.

Hybrid host-based/node-based intrusion prevention system technologies may be implemented on all nodes 270A-270N on Ethernet networks 55 and 56 that may be targeted by a network attack. In general, each node is comprised of a reprogrammable computer having a central processing unit (CPU), a memory module operable to store machine-readable code that is retrievable and executable by the CPU, and may further comprise various peripheral devices, such as a display monitor, a keyboard, a mouse or another device, connected thereto. A storage media, such as a magnetic disc, an optical disc or another component operable to store data, may be connected to memory module and accessible thereby and may provide one or more databases for archiving local intrusion events and intrusion event reports. An operating system may be loaded into memory module, for example upon bootup of the respective node, and comprises an instance of a protocol stack as well as various low-level software modules required for tasks such as interfacing to peripheral hardware, scheduling of tasks, allocation of storage as well as other system tasks. Each node protected by the hybrid host-based and node-based IPS of the present invention accordingly has an IPS software application maintained within the node, such as in a magnetic hard disc, that is retrievable by the operating system and executable by the central processing unit. Additionally, each node executing an instance of the IPS application has a local database from which signature descriptions of documented attacks may be fetched from storage and compared with a packet or frame of data to detect a correspondence therebetween. Detection of a correspondence between a packet or frame at an IDS server may result in execution of any one or more of various security procedures.

The IPS described with reference to FIG. 2 may be implemented on any number of platforms. Each hybrid host-based/node-based instance of the IPS application described herein is preferably implemented on a network node, such as web server 270A operated under control of an operating system, such as Windows NT 4.0 that is stored in a main memory and running on a central processing unit, and attempts to detect attacks targeted at the hosting node. The particular network 100 illustrated in FIG. 2 is exemplary only and may comprise any number of network servers. Corporate, and other large scale, networks may typically comprise numerous individual systems providing similar services. For example, a corporate network may comprise hundreds of individual web servers, mail servers, FTP servers and other systems providing common data services.

Figure 3:
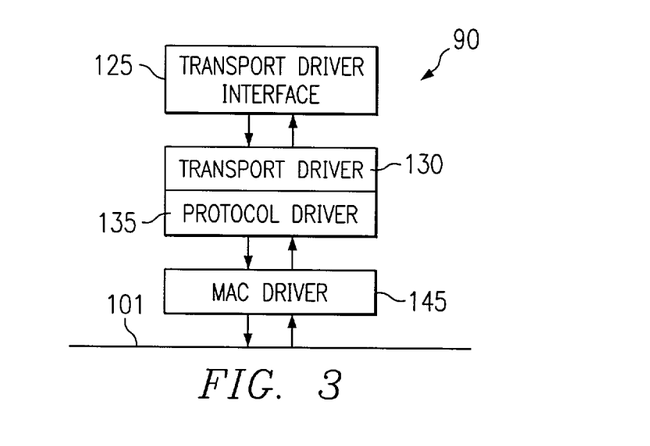
FIG. 3 is an exemplary network protocol stack according to the prior art.

Each operating system of a node incorporating an instance of an IPS application additionally comprises a network protocol stack 90, as illustrated in FIG. 3, that defines the entry point for frames received by a targeted node from the network, e.g. the Internet or Intranet. Network stack 90 as illustrated is representative of the well-known WindowsNT (TM) system network protocol stack and is so chosen to facilitate discussion and understanding of the invention. However, it should be understood that the invention is not limited to a specific implementation of the illustrated network stack 90 but, rather, stack 90 is described to facilitate understanding of the invention. Network stack 90 comprises a transport driver interface (TDI) 125, a transport driver 130, a protocol driver 135 and a media access control (MAC) driver 145 that interfaces with the physical media 101. Transport driver interface 125 functions to interface the transport driver 130 with higher-level file system drivers. Accordingly, TDI 125 enables operating system drivers, such as network redirectors, to activate a session, or bind, with the appropriate protocol driver 135. Accordingly, a redirector can access the appropriate protocol, for example UDP, TCP, NetBEUI or other network or transport layer protocol, thereby making the redirector protocol-independent. The protocol driver 135 creates data packets that are sent from the computer hosting the network protocol stack 90 to another computer or device on the network or another network via the physical media 101. Typical protocols supported by an NT network protocol stack comprise NetBEUI, TCP/IP, NWLink, Data Link Control (DLC) and AppleTalk although other transport and/or network protocols may be comprised. MAC driver 145, for example an Ethernet driver, a token ring driver or other networking driver, provides appropriate formatting and interfacing with the physical media 101 such as a coaxial cable or another transmission medium.

The capabilities of the host-based IPS comprise application monitoring of: file system events; registry access; successful security events; failed security events and suspicious process monitoring. Network access applications, such as Microsoft IIS and SQL Server, may also have processes related thereto monitored.

Intrusions may be prevented on a particular IPS host by implementation of inline, node-based monitoring technologies. The inline-IPS is preferably comprised as part of a hybrid host-based/node-based IPS although it may be implemented independently of any host-based IPS system. The inline-IPS will analyze packets received at the hosting node and perform signature analysis thereof against a database of known signatures by network layer filtering.

Figure 4:
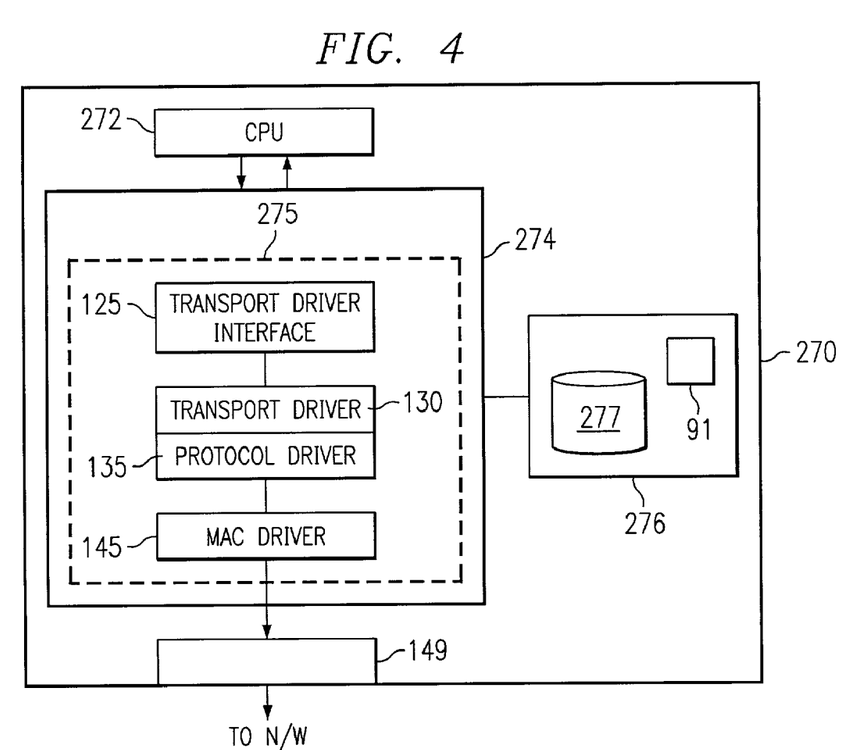
FIG. 4 illustrates a network node that may run an instance of an intrusion protection system application according to an embodiment of the present invention.

In FIG. 4, there is illustrated a network node 270 that may run an instance of an IPS application 91 and thus operate as an IPS server. IPS application 91 may be implemented, as a three-layered IPS as described in co-pending application entitled "Method, Computer Readable Medium, and Node for a Three-Layered Intrusion Prevention System for Detecting Network Exploits" and filed concurrently herewith, and may comprise a server application and/or a client application. Network node 270, in general, comprises a central processing unit (CPU) 272 and a memory module 274 operable to store machine-readable code that is retrievable and executable by CPU 272 via a bus (not shown). A storage media 276, such as a magnetic disc, an optical disc or another component operable to store data, may be connected to memory module 274 and accessible thereby by the bus as well. An operating system 275 may be loaded into memory module 274, for example upon bootup of node 270, and comprises an instance of protocol stack 90 and may have an intrusion prevention system application 91 loaded from storage media 276. One or more network exploit rules, an exemplary form described in co-pending application entitled "Method, Node and Computer Readable Medium for Identifying Data in a Network Exploit" and filed concurrently herewith, may be compiled into a machine-readable signature(s) and stored within a database 277 that is loadable into memory module 274 and may be retrieved by IPS application 91 for facilitating analysis of network frames and/or packets.

Figure 5:
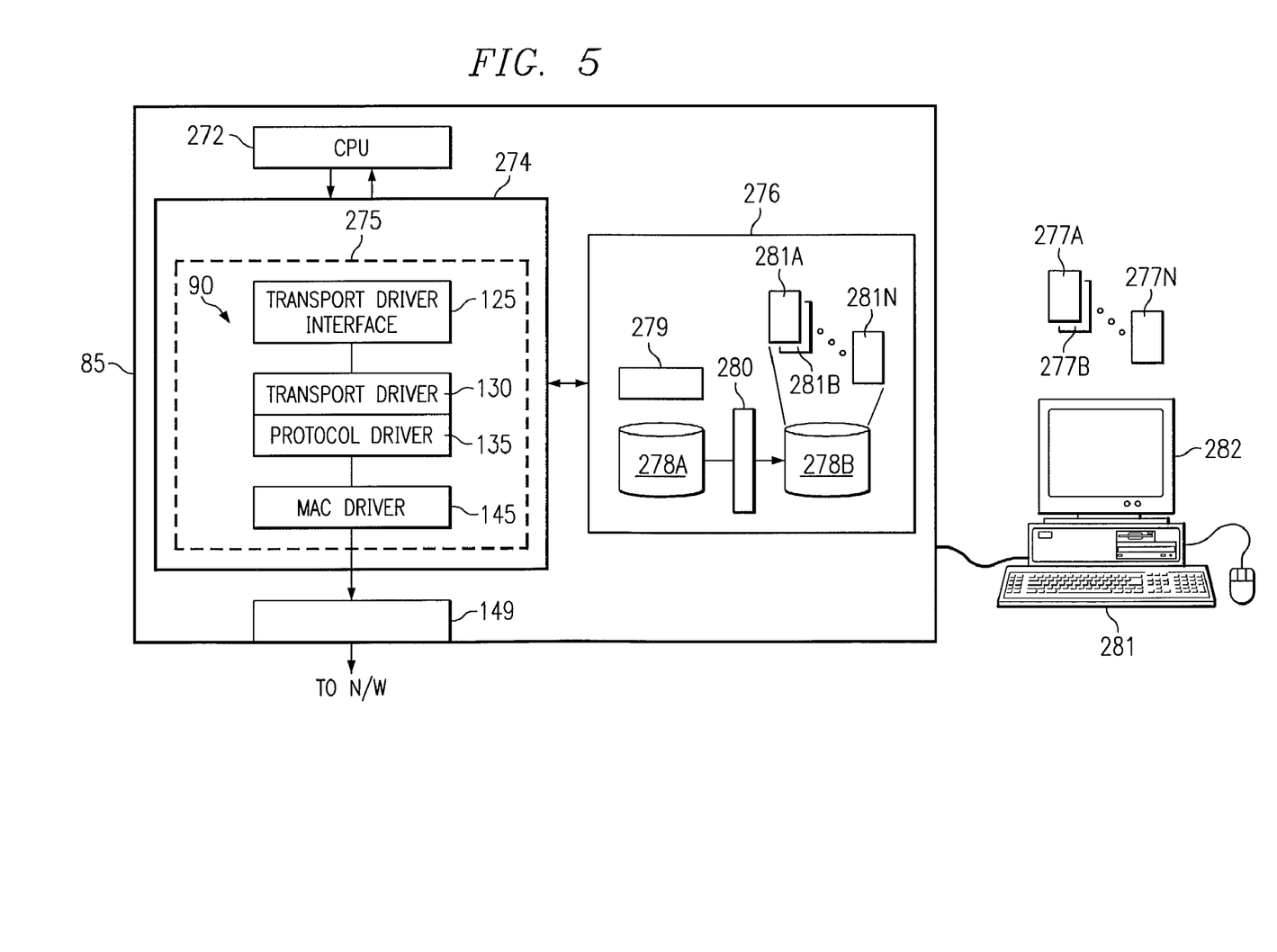
FIG. 5 illustrates an exemplary network node that may operate as a management node within a network protected by the intrusion protection system according to an embodiment of the present invention.

In FIG. 5, there is illustrated an exemplary network node that may operate as a management node 85 of the IPS of a network 100. Management node 85, in general, comprises a CPU 272 and a memory module 274 operable to store machine-readable code that is retrievable and executable by CPU 272 via a bus (not shown). A storage media 276, such as a magnetic disc, an optical disc or another component operable to store data, may be connected to memory module 274 and accessible thereby by the bus as well. An operating system 275 may be loaded into memory module 274, for example upon bootup of node 85, and comprises an instance of protocol stack 90. Operating system 275 is operable to fetch an IPS management application 279 from storage media 276 and load management application 279 into memory module 274 where it may be executed by CPU 272. Node 85 preferably has an input device 281, such as a keyboard, and an output device 282, such as a monitor, connected thereto.

An operator of management node 85 may input one or more text-files 277A-277N via input device 281. Each text-file 277A-277N may define a network-based exploit and comprise a logical description of an attack signature as well as IPS directives to execute upon an IPS evaluation of an intrusion-related event associated with the described attack signature. Each text file 277A-277N may be stored in a database 278A on storage media 276 and compiled by a compiler 280 into a respective machine-readable signature file 281A-281N that is stored in a database 278B. Each of the machine-readable signature files 281A-281N comprises binary logic representative of the attack signature as described in the respectively associated text-file 277A-277N. An operator of management node 85 may periodically direct management node 85, through interaction with a client application of IPS application 279 via input device 281, to transmit one or more machine-readable signature files (also generally referred to herein as "signature files") stored in database 278B to a node, or a plurality of nodes, in network 100. Alternatively, signature files 281A-281N may be stored on a computer-readable medium, such as a compact disk, magnetic floppy disk or another portable storage device, and installed on node 270 of network 100. Application 279 is preferably operable to transmit all such signature-files 281A-281N, or one or more subsets thereof, to a node, or a plurality of nodes, in network 100.

Preferably, IPS application 279 provides a graphical user interface on output device 282 for facilitating input of commands thereto by an operator of node 85.

As new attacks are developed and signatures and countermeasures are defined therefor, the newly defined signatures and countermeasures need to be integrated into the IPS implemented within protected nodes of the network that may be targeted by the new attack and/or network-based IPS appliances that that may be assigned to protect the network. Accordingly, control and management of an IPS designed for protecting a large corporate, or otherwise large-scale, network requires mechanisms for distributing command and security updates from one or more management nodes to various IPS servers located throughout the network.

The present invention provides a mechanism for reducing the requisite bandwidth capacity of a management console and facilitates a reduction in network bandwidth consumed when distributing command and security updates from a management console within a network by allowing a subset of select nodes to be upgraded from a central management console in a manner that alleviates unnecessary updates being performed on nodes that may be adversely effected by a security update.

Figure 6:
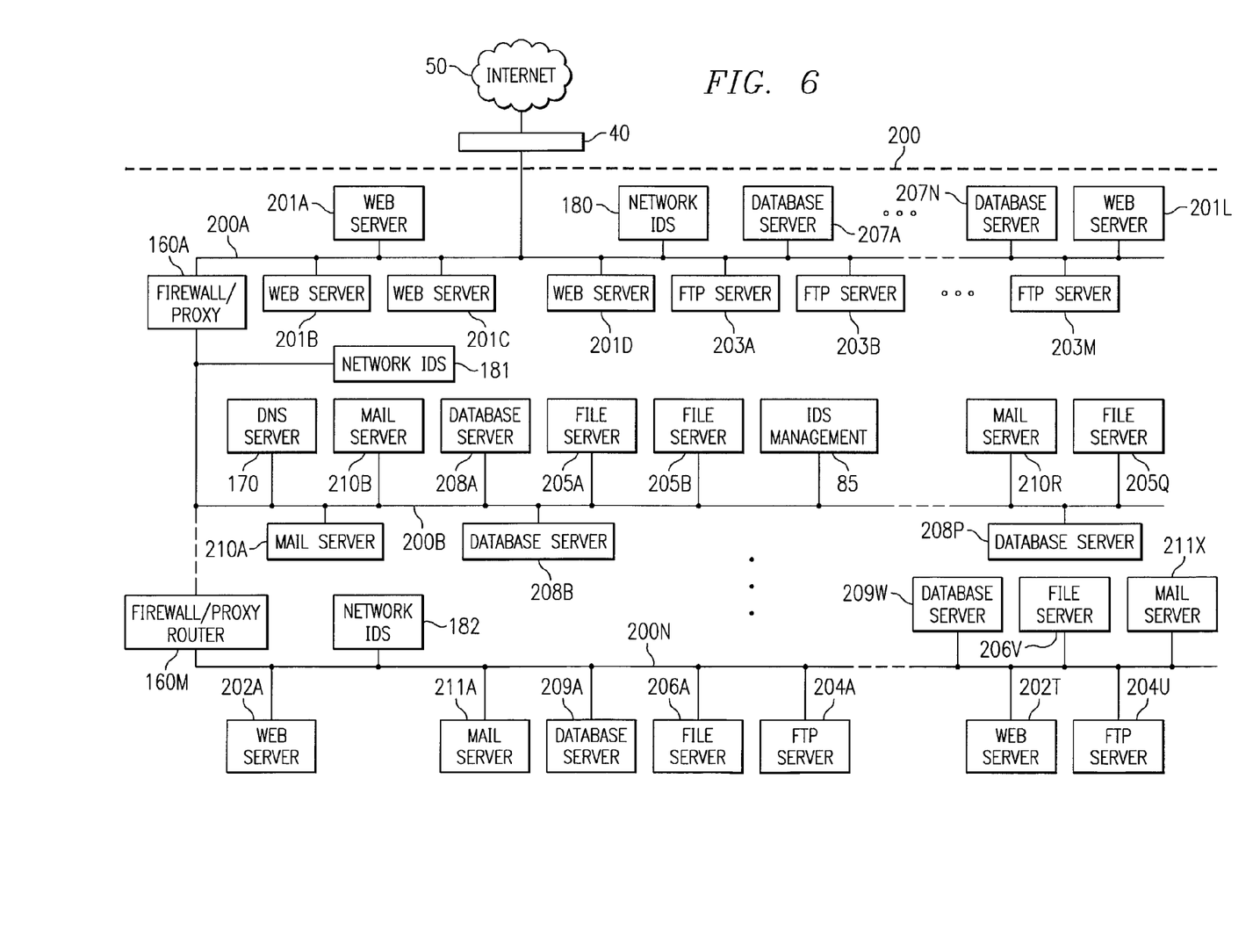
FIG. 6 is a simplified illustration of a network that may have an enterprise intrusion prevention system according to an embodiment of the present invention deployed thereon.

With reference to FIG. 6, there is illustrated a simplified network 200 that may have an enterprise intrusion prevention system that preferably employ network-based and hybrid host-based and node-based intrusion detection technologies according to an embodiment of the invention. A protected network 200 may include one or more subnetworks, such as Ethernets 200A-200N, interfaced with respective routers 160A-160M. Network 200 may interface with Internet 50 via a router 40. Exemplary Ethernet 200A includes a plurality of web servers 201A-201L, a plurality of FTP servers 203A-203M and a plurality of database servers 207A-207N. A network-based IPS appliance 180 is preferably connected with Ethernet 200A via a network interface card (not shown) operating in "promiscuous mode" and is operable to scan and identify suspect network frames received on Ethernet 200A. A firewall/proxy router 160A may interface Ethernet 200A with Ethernet 200B and facilitates forwarding of packets therebetween and provides security measures and/or proxy services to facilitate access to Internet 50 for nodes on Ethernets 200B-200N. Exemplary Ethernet 200B includes a domain name server 170, a plurality of file servers 205A-205Q, a plurality of database servers 208A-208P and a plurality of mail servers 210A-210R. Ethernet 200B may have a network-based IPS appliance 181 operable to monitor and identify suspect network frames transmitted across Ethernet 200B. A plurality of other networks 200C-200M (not shown) may be connected with, or included within, network 200. An exemplary final Ethernet 200N may interface with other Ethernets 200A-200M via a firewall/proxy router 160M. Exemplary Ethernet 200N includes a plurality of web servers 202A-202T, a plurality of FTP servers 204A-204U, a plurality of file servers 206A-206V, a plurality of database servers 209A-209W and a plurality of mail servers 211A-211X as well as a network-based IPS appliance 182 operable to monitor and identify suspect network frames transmitted over Ethernet 200N. Additionally, one or more IPS management nodes 85 is connected to network 200 and may receive alerts from respective nodes within network 200 upon detection of an intrusion event as well as originate distribution of command and security updates to various IPS servers operating on any of the various network 200 nodes according to an embodiment of the invention. Each server, or node, 201A-201L, 202A-202T, 203A-203M, 204A-204U, 205A-205Q, 206A-206V, 207A-207N, 208A-208P, 209A-209W, 210A-210R and 211A-211X preferably conforms to the general description of node 270 described hereinabove and each node preferably runs an instance of IPS application 91 and maintains a respective database 277 of signature files that may be filtered by the respective node. The contents of database instance 277 may differ from node to node and the machine-readable signatures stored therein may be periodically modified, deleted, or expanded.

Pursuant to reducing the requisite bandwidth capacity of IPS management node 85, nodes running IPS application 91 may have logical group designations assigned thereto to which common security policies may be applied. For example, mail servers 210A-211X may be logically associated together because, due to the commonality of their services, they may be targeted by identical attacks that do not effect other nodes providing different network services. Thus, a security update, such as signature files comprising machine-readable attack signatures related to an (simple mail transfer protocol) SMTP attack, broadcast throughout the network will be received by all nodes having an IPS instance installed thereon regardless of whether the associated node is susceptible to such an attack or not. In addition to requiring processing and transmission bandwidth that is essentially wasted at management node 85 responsible for generating and transmitting the security update, network bandwidth may be inefficiently utilized broadcasting the update message to nodes that do not require protection from the security measure provided by the broadcast message. Additionally, common IPSs install all such security updates and continue to process the signatures provided thereby each time a frame or packet is analyzed by the IPS. Overtime, a given node may accumulate numerous security updates that provide security measures associated with attacks that are inapplicable to the node. Processing of such security measures is inefficient and can result in operational losses and inefficiencies of IPS application 91 as well as well as operation losses of the hosting node.

Figure 7:
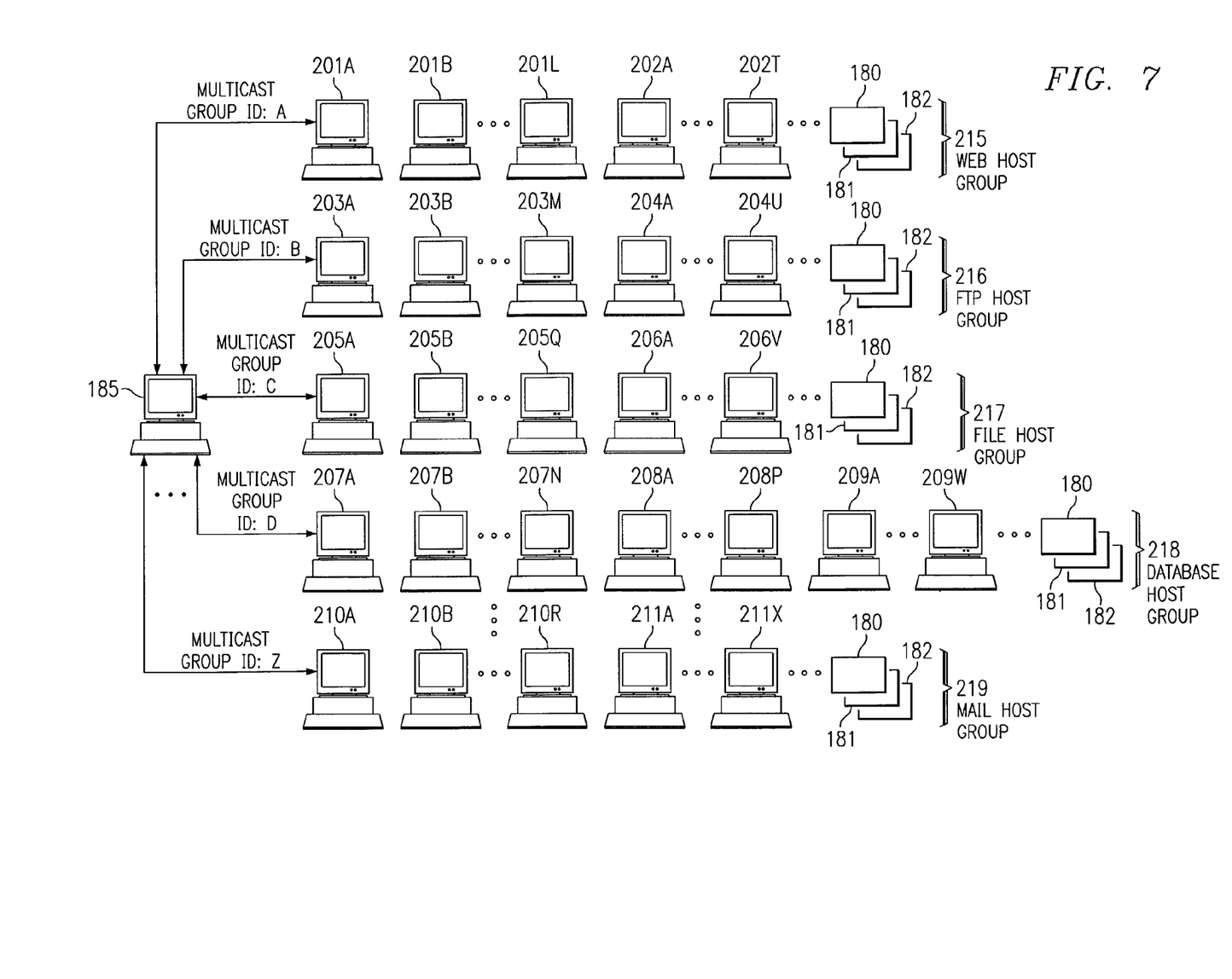
FIG. 7 illustrates a logical grouping of nodes disposed in a network that facilitates multicasting of command and security updates from a management node according to an embodiment of the present invention.

With reference to FIG. 7, there is illustrated a logical grouping of nodes disposed in network 200 that facilitates multicasting of command and security updates from management node 85 according to an embodiment of the invention. Web servers 201A-202T may be logically associated by management node 85 based upon the commonality of the services respectively provided thereby. Accordingly, an identification of the logical assignment grouping web servers 201A-201T may be assigned and shared among web servers 201A-202T such that command and security updates, such as attack signatures defining signatures of attacks that may be directed towards a web-content server, may be commonly addressed and distributed only to those nodes that may be effected thereby, i.e., the identification of the logical assignment serves to group one or more nodes of network 200 into logical groups—each node in a group being commonly vulnerable to a particular exploit. In an exemplary embodiment, the identification is preferably implemented as an IP multicast group ID. Accordingly, multicast group ID A is preferably a 28 bit multicast identification and servers 201A-202T thus comprise a host group 215. Other servers may be added to host group 215 comprised of web servers 201A-202T and servers included in host group 215 may be removed therefrom through well-known mechanisms such as Internet group management protocol (IGMP) reports. Other multicasting mechanisms, such as user datagram protocol (UDP) multicasting mechanisms, may be substituted therefore. In order to accommodate multicasting across separate networks 200A-200N, routers 160A-160M are preferably multicasting-enabled such that multicast messages may have addresses resolved across various networks 200A-200N having hosts belonging to common multicast groups.

In a similar manner, FTP servers 203A-204U may be logically associated and comprise an FTP host group 216 and have a multicast group ID B assigned thereto by management node 85. Likewise, file servers 205A-206V may have a multicast group ID C assigned thereto and comprise a file server host group 217, database servers 207A-207W may have a multicast group ID D assigned thereto and comprise a database server host group 218 and mail servers 210A-211X may have a multicast group ID Z assigned thereto and comprise a mail server host group 219.

Accordingly, management node 85 may synchronize command and security updates to the servers of one or more host groups via multicasting. The requisite resource and bandwidth of management node 85 is thus reduced. Preferably, command and security updates delivered via multicast messaging is encrypted between management node 85 and the addressed multicast group. Thus, data integrity may be maintained by validating the network frame headers against an integrity algorithm executed at each node included in a host group. Communication authentication may be performed by establishing and authenticating a session that is used for performing the updates. Security updates received by a node of network 200 according to the aforedescribed distribution technique may then be stored in database 277 and fed into an exemplary associative process engine described by co-pending application entitled "Method, Node and Computer Readable Medium for Identifying Data in a Network Exploit" and filed concurrently herewith for filtering network packets and/or frames.

It should be understood that inclusion of a node within a host group 215-219 does not exclude inclusion of the node within another host group but, rather, a given node may be included within multiple host groups 215-219. Additionally, network-based IPS appliances 180-182 may be included within one or more host groups 215-219.

What is claimed is:

1. A network having an intrusion protection system, comprising:
    a network medium;
    a management node connected to the network medium and running an intrusion prevention system management application;
    a plurality of nodes connected to the network medium and running an instance of an intrusion protection system application, at least one of the nodes having an identification assigned thereto based on a logical assignment grouping one or more of the plurality of nodes, each node sharing an identification being commonly vulnerable to at least one network exploit; and
    a network-based intrusion protection system appliance dedicated to filtering inbound and outbound data frames transmitted across the network medium.

2. The network according to claim 1 wherein the network-based intrusion protection system appliance interfaces with the network medium via a network interface card operating in promiscuous mode.

3. The network according to claim 1 wherein the network-based intrusion protection system appliance shares the identification.

* * * * *

UNITED STATES PATENT AND TRADEMARK OFFICE
CERTIFICATE OF CORRECTION

| | | |
|---|---|---|
| PATENT NO. | : 7,444,679 B2 | Page 1 of 1 |
| APPLICATION NO. | : 10/001446 | |
| DATED | : October 28, 2008 | |
| INVENTOR(S) | : Richard Paul Tarquini et al. | |

It is certified that error appears in the above-identified patent and that said Letters Patent is hereby corrected as shown below:

In column 3, line 61, after "network-based" insert -- IPS --.

Signed and Sealed this

Seventeenth Day of March, 2009

JOHN DOLL
*Acting Director of the United States Patent and Trademark Office*